UNITED STATES PATENT OFFICE.

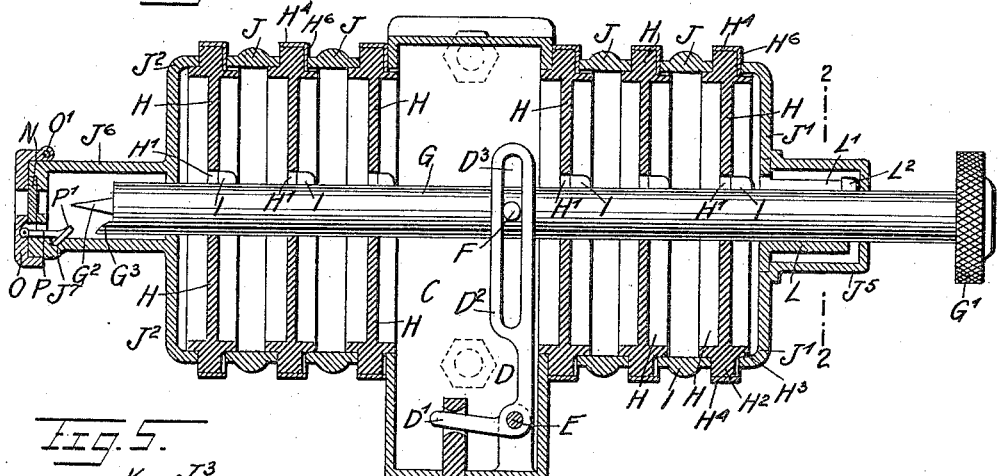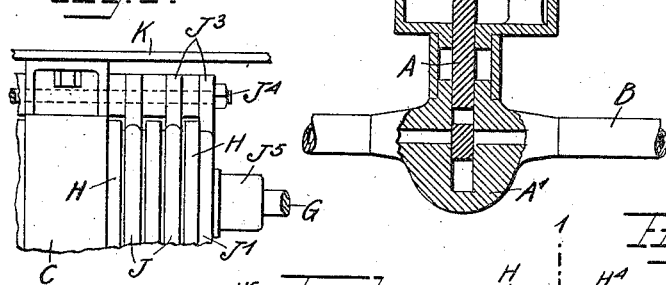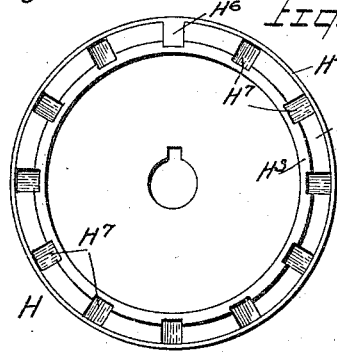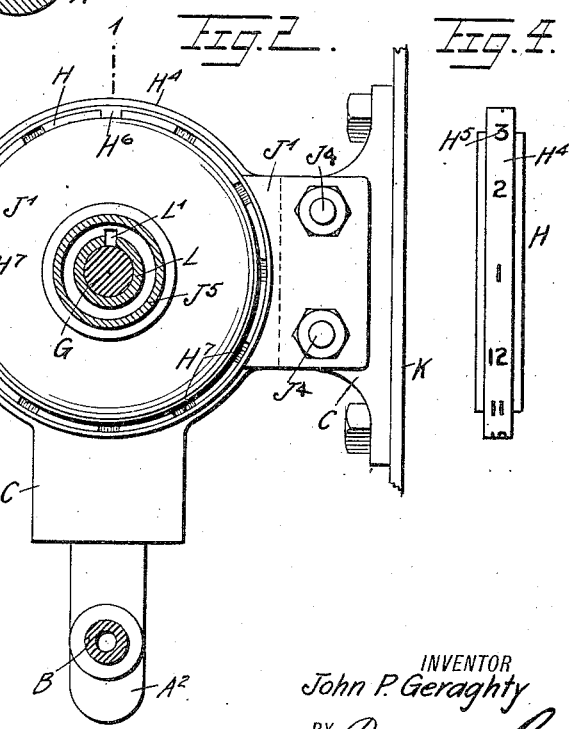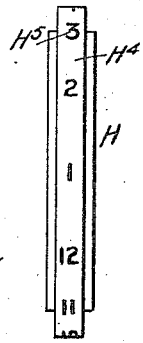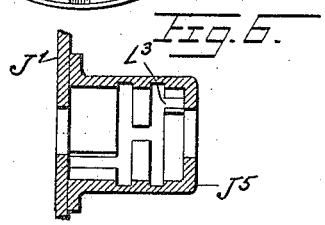

JOHN P. GERAGHTY, OF JERSEY CITY, NEW JERSEY.

VALVE-CONTROLLING DEVICE FOR TANKS.

1,182,163.   Specification of Letters Patent.   Patented May 9, 1916.

Application filed October 19, 1914. Serial No. 867,330.

*To all whom it may concern:*

Be it known that I, JOHN P. GERAGHTY, a citizen of the United States, and a resident of Jersey City, in the county of Hudson and State of New Jersey, have invented a new and Improved Valve-Controlling Device for Tanks, of which the following is a full, clear, and exact description.

The object of the invention is to provide a new and improved valve controlling device more especially designed for use on automobiles and other power vehicles, and arranged to control the flow of gasolene from the tank to the carbureter so as to interrupt the supply of fuel to the internal combustion engine of the vehicle, with a view to prevent unauthorized persons from running away with the vehicle.

In order to accomplish the desired result use is made of a spindle mounted to slide and connected with a valve to open and close the same, spaced lugs on the spindle, and tumblers mounted to rotate loosely on the said spindle adjacent the said lugs, the tumblers being provided with notches adapted to register with the said lugs to allow of shifting the spindle in the direction of its length at the time the several notches of the tumblers are in alinement with the lugs on the said spindle.

A practical embodiment of the invention is represented in the accompanying drawings forming a part of this specification, in which similar characters of reference indicate corresponding parts in all the views.

Figure 1 is a longitudinal central section of the controlling device on the line 1—1 of Fig. 2; Fig. 2 is a cross section of the same on the line 2—2 of Fig. 1; Fig. 3 is a face view of one of the tumblers; Fig. 4 is an edge view of the same; Fig. 5 is a reduced plan view of part of the valve-controlling device shown attached to a suitable support on the vehicle; and Fig. 6 is a sectional side elevation of a modified form of the guide for the spindle.

The valve A to be controlled by the device is preferably in the form of a gate valve mounted to slide in a valve body $A'$ attached to the supply pipe B extending from the gasolene tank to the carbureter of the internal combustion engine mounted on a vehicle in the usual manner for driving the same. When the valve A is in open position the gasolene can flow from the tank to the carbureter, but when the valve A is in closed position the flow is interrupted and consequently the supply of gasolene to the carbureter is stopped.

The upper end of the valve A extends into a casing C and the said upper end is engaged by one arm $D'$ of a bell crank lever D fulcrumed at E within the casing C. The other arm $D^2$ of the bell crank lever D is provided with a slot $D^3$ into which extends a pin F held on a spindle G mounted to slide lengthwise through the casing, the spindle extending at one end to the outside of the casing, and this outer end of the spindle is provided with a knob or handle $G'$ for moving the spindle in the direction of its length.

On the spindle G are mounted to rest loosely tumblers H, preferably six in number, and disposed three on each side of the casing C, as plainly indicated in the drawings. Each of the tumblers H is provided at its bore with a notch or slot $H'$ adapted to register with a lug I secured on the spindle G so that when the several notches $H'$ are in alinement with the lugs I then the spindle G can be moved in the direction of its length. Normally, however, the tumblers H are in such positions that the notches $H'$ are out of register with the lugs I and the latter are adjacent to the right-hand faces of the tumblers H to prevent the spindle G from being moved from the right to the left. When the spindle G is in locked position as shown in Fig. 1, then the valve A is closed and the flow of the gasolene through the supply pipe B is stopped. When it is desired to use the machine, the operator in charge turns the tumblers H on the spindle G according to a previously determined combination, that is, until the notches $H'$ are in register with the lugs I to allow the operator to push the spindle G from the right to the left. When this takes place a swinging motion is given by the pin F to the bell crank lever D to swing the valve A downward into open position.

The tumblers H on each side of the casing C are spaced apart by washers J, and the outermost tumblers are held in place by caps $J'$, $J^2$, and the said washers and caps are provided with rearmost extensions $J^3$ engaged by a bolt $J^4$ which also extends through the casing C to securely fasten the washers and caps in place to hold the tumblers spaced apart but free to rotate on the spindle G. The caps $J'$ and $J^2$ are provided with bearings $J^5$, $J^6$ in which the spindle G is mounted to slide in the direction of the length of the spindle. The rear end of the casing C is fastened to a suitable support K on the vehicle so that the knob G' of the spindle G is within convenient reach of the operator in charge of the automobile. In order to normally hold the spindle G against turning, use is made of a thimble L attached to or forming part of the cap $J^5$, and the said thimble is provided with a lengthwise extending slot L' into which projects a stud $L^2$ held on the spindle G. Instead of forming the guiding slot L' for the stud $L^2$ straight, as shown in Fig. 1, the said guiding slot may be made irregular, as indicated at $L^3$ in Fig. 6, it being understood that in this case the spindle G must be turned and pushed inward in order to cause the stud $L^2$ to follow the slot $L^3$.

In order to enable the owner of the vehicle to ascertain at a glance whether the vehicle was surreptitiously used by a party who has come into possession of the combination, the following arrangement is made: On the forward end of the spindle G is secured or formed a piercing point $G^2$ adapted to pierce a card N held on the outer end of the bearing $J^6$ by the use of a cap O hinged at its upper end at O' to the bearing $J^6$. The cap O is provided with an inwardly extending locking arm P fulcrumed on the cap and having at its free end a retaining plate P' normally engaging a recess $J^7$ formed in the inner face of the bearing $J^6$ so as to hold the cap O closed. The spindle G is provided adjacent the piercing point $G^2$ with an inclined lug $G^3$ adapted to engage the retaining plate P' to lift the latter out of engagement with the recess $J^7$ to unlock the cover O with a view to allow the removal of a pierced card N by the owner and to allow the substitution of a new card prior to re-setting the device. It is understood that when the device is used by an unauthorized person knowing the combination then the card N is pierced by the point $G^2$ on pushing the spindle G inward for opening the valve A, as previously explained, and hence the owner of the car can readily detect on inspection of the card N that the car has been surreptitiously used. For persons not knowing the combination it is impossible to manipulate the device as the spindle G cannot be pushed inward unless the several tumblers H are in proper position, that is, with their notches H' in alinement with the lugs I.

Each of the tumblers H is in the form of a disk having a rim $H^2$ provided with annular flanges $H^3$ fitting against the under side of the washers J, caps J', $J^2$ and the casing C, as will be readily understood by reference to Fig. 1, so as to properly guide the tumblers H on rotating the same. Onto the peripheral face of each rim $H^2$ fits a ring $H^4$ provided with indicating characters $H^5$, such as numerals, letters of the alphabet, etc., to permit of setting the tumblers according to a predetermined combination. Each ring $H^4$ is provided at one side with a flange $H^6$ adapted to engage one of a series of recesses $H^7$ arranged on the corresponding face of the rim $H^2$ (see Fig. 3). When it is desired to change the combination to suit the convenience of the owner then the ring $H^4$ can be shifted on the rim $H^2$ by disengaging the flange $H^6$ from the recess $H^7$ it occupies, and then turning the rim to engage the flange $H^6$ with another of the recesses $H^7$. In doing so the position of the indicating characters $H^5$ are changed relative to the position of the notch H' and consequently the combination is changed correspondingly. It is understood that the indicating characters of the several tumblers forming the combination must stand in alinement at any desired point, preferably in alinement with a mark on the casing to indicate that the notches H' are all in alinement with the lugs I to allow shifting of the spindle G in the direction of the length thereof. When the valve A is in closed position the spindle G is in its extreme right-hand position, as shown in Fig. 1, with the several tumblers H in such position that their notches H' are out of register with the lugs I. When the owner desires to use the car it is necessary to open the valve A by pushing the spindle G inward, and in order to be enabled to do so the tumblers H must be turned until the corresponding indicating characters $H^5$ of the predetermined combination are in lengthwise alinement with each other, so that the several notches H' are all in alinement with the lugs I. The spindle G is now pushed from the right to the left to cause the lever D to move the valve A into open position. When it is desired to prevent an unauthorized person from running away with the vehicle then the spindle G is pushed from the left to the right so that the valve A moves into closed position, and then the several tumblers are turned a sufficient distance to move their notches H' out of register with the lugs I to prevent inward movement of the spindle G.

The vehicle controlling device shown and described is very simple in construction and is composed of comparatively few parts not liable to get out of order easily.

Having thus described my invention, I claim as new and desire to secure by Letters Patent:

1. A valve controlling device for gasolene tanks, comprising a casing into which one end of the valve to be controlled extends, the said casing having means for securing it to a support, a lever connected with the valve, a spindle extending through the casing and connected with the said lever to open and close the valve, tumblers mounted to rotate loosely on the spindle at opposite sides of the said casing, the said tumblers coöperating with the spindle to control the movement thereof, washers spacing the tumblers apart, caps for holding the outermost tumblers in place, the washers and caps having rearward extensions, means for fastening the said extensions of the washers and caps to the casing, and bearings on the said caps in which the said spindle is mounted to slide in the direction of its length.

2. A valve controlling device for gasolene tanks, comprising a casing having a rearward extension, a spindle extending through the casing in the direction of the length of the spindle, and projecting from opposite sides of the casing, tumblers mounted to rotate loosely on the spindle at each side of the casing and coöperating with the spindle to control the movement thereof, the said tumblers having rims provided at their peripheral faces with indicating characters, a connection between the spindle and the valve to open or close the valve when the spindle is actuated, washers for spacing the tumblers apart, caps engaging the outermost tumblers to hold the same in place, the caps being provided with bearings in which the spindle is mounted to slide, the said washers and caps having rearward extensions, means for fastening the said extensions to the rearward extension of said casing, and a guide for guiding the spindle in its lengthwise movement.

3. A valve controlling device for gasolene tanks, comprising a casing, a spindle mounted to slide in the said casing in the direction of the length of the spindle, tumblers mounted to rotate loosely on the spindle at opposite sides of the casing, and coöperating with the spindle to control the movement thereof, the said tumblers having rims provided at their peripheral faces with indicating characters, a connection between the spindle and the valve to be controlled to open and close the valve, washers for spacing the tumblers apart, caps for holding the outermost tumblers in place, the caps being provided with bearings in which the spindle is mounted to slide, means for securing the casing to a support and means for fastening the washers and caps to said casing, one of said caps being provided with a thimble having a guide slot, the said spindle having a stud projecting into said guide slot.

4. In a valve controlling device, a casing, a spindle mounted to slide in the said casing in the direction of the length of the spindle, the end of the spindle being provided with a piercing point, means connecting the spindle with the valve to be controlled, and a card held in the said casing in the path of the said point to be pierced when the spindle is actuated to open the valve.

5. In a valve controlling device, a casing, a spindle mounted to slide in the said casing in the direction of the length of the spindle, the end of the spindle being provided with a piercing point, means connecting the spindle with the valve to be controlled, a card held in the said casing in the path of the said point to be pierced when the spindle is actuated to open the valve, a hinged cap on the casing for covering the said card, and a locking arm on the cap and engaging the casing to hold the cap normally locked, the said locking arm being controlled by the spindle.

6. In a valve controlling device, a casing, bearings at the ends of the casing, a spindle mounted to slide in said bearings in the direction of the length of the spindle, one end of the spindle being provided with a piercing point, means connecting the spindle with the valve to be controlled, a card at the outer end of one of said bearings in the path of the said point, to be pierced when the spindle is actuated to open the valve, a cap hinged on the said bearings for covering the said card, an inwardly extending locking arm fulcrumed on the cap and having a retaining plate at the free end adapted to engage a recess in the inner face of the said bearing to hold the covering cap normally locked, the said spindle being provided adjacent the piercing point with a lug for engaging the retaining plate to lift the latter out of engagement with the said recess to unlock the cap.

In testimony whereof I have signed my name to this specification in the presence of two subscribing witnesses.

JOHN P. GERAGHTY.

Witnesses:
  THEO. G. HOSTER,
  PHILIP D. ROLLHAUS.

Copies of this patent may be obtained for five cents each, by addressing the "Commissioner of Patents, Washington, D. C."